United States Patent
Parvulescu

[11] Patent Number: 6,081,758
[45] Date of Patent: Jun. 27, 2000

[54] SYSTEM FOR AUTOMATICALLY UNLOCKING AN AUTOMOTIVE CHILD SAFETY DOOR LOCK

[75] Inventor: Adrian Parvulescu, Fish Eddy, N.Y.

[73] Assignees: Sony Corporation, Tokyo, Japan; Sony Electronics, Inc., Park Ridge, N.J.

[21] Appl. No.: 09/054,454

[22] Filed: Apr. 3, 1998

[51] Int. Cl.[7] .................................................. B60K 28/14
[52] U.S. Cl. ............................ 701/45; 280/735; 307/10.1
[58] Field of Search ...................................... 701/1, 45, 49; 307/10.1, 10.2; 280/734, 735; 70/237; 340/449; 180/274

[56] References Cited

U.S. PATENT DOCUMENTS

| | | | |
|---|---|---|---|
| 3,743,849 | 7/1973 | Iwata | 307/10.1 |
| 4,633,967 | 1/1987 | Kranz | 180/274 |
| 4,989,081 | 1/1991 | Miyagawa et al. | 358/93 |
| 5,327,990 | 7/1994 | Busquets | 180/271 |
| 5,481,139 | 1/1996 | Lucas | 307/9.1 |
| 5,574,315 | 11/1996 | Weber | 307/10.1 |
| 5,646,608 | 7/1997 | Shintani | 340/825.52 |
| 5,894,906 | 4/1999 | Weber | 180/274 |

*Primary Examiner*—Michael J. Zanelli
*Attorney, Agent, or Firm*—Ronald P. Kananen; Rader, Fishman & Grauer

[57] ABSTRACT

A system for automatically unlocking an automotive child safety door lock comprises an emergency sensor such as a collision sensor initiating airbag deployment, a door lock mechanism and a door lock releasing mechanism. Upon the sensor detecting an emergency, such as a collision, the sensor produces a signal that is sent to the door lock releasing mechanism. The door lock releasing mechanism then unlocks the door lock mechanism. The sensor may also trigger disconnection of the battery from the automobile's electrical circuitry and interruption of the fuel line from the fuel tank to the engine. The emergency sensor may alternatively include a temperature or smoke sensor.

15 Claims, 2 Drawing Sheets

SYSTEM FOR AUTOMATICALLY UNLOCKING AN AUTOMOTIVE CHILD SAFETY DOOR LOCK

BACKGROUND OF THE INVENTION

1. Field of the Invention

The present invention relates generally to the automotive industry, and more specifically deals with transportation safety issues. Still more specifically, the invention addresses the problem of child safety in automobiles after the airbag in the vehicle has been activated.

2. Description of the Related Art

Child safety vehicle door locks have for some years become a common feature in automobiles. They provide an engaging arrangement for selectively blocking operation of an operating handle to prevent release of the door latch by an unauthorized person such as a child passenger. The blocking arrangement may include a blocking lever pivotally mounted on the latch frame for manual movement between engaged and disengaged positions. One of the arrangements of this kind is disclosed, for example, in the U.S. Pat. No. 4,969,673, to Portelli, et al.

Also, a locking mechanism is known from U.S. Pat. No. 4,652,768, to Gmeiner, et al., for the locks of the rear doors of a vehicle with one locking device for each door lock acting against the unauthorized opening of the doors from the interior side of the doors. Each locking device is assigned an electric-motor-driven control unit whose rotational direction is reversible. The control unit can be remotely operated with respect to locking or unlocking of the lock by a switching element that can be operated from the front seats.

On the other hand, vehicle airbags have also been known in the art. They are deservedly credited for saving many lives, have become indispensable in modem automobiles, and are constantly being improved. For example, more safety is provided for passengers by adding side airbags to protect against side collisions (see, e.g., U.S. Pat. No. 5,447,326, to Laske, et al.). An additional safety feature for airbags provides a control for controlling the force with which the airbags are deployed and inflated (see, e.g., U.S. Pat. No. 5,395,134, to Gunn, et al.).

There is, however, an issue directly or indirectly connected with airbags and other vehicle emergency devices that can be defined as an after-accident child safety problem. In an automobile accident, children may get trapped in the vehicle because the child safety door locks are engaged. In other words, they may be placed at risk by the very circuitry that was designed for their safety. Various collision scenarios occurring separately or in combination can create this situation. The parent(s) may be unconscious and unable to help. The airbags in the front of the car could block a child from exiting through the front doors. The vehicle roof may be crushed in the middle thus blocking communication between the front and the rear of the vehicle. The vehicle may be submersed in water. The vehicle may be leaking fuel and about to catch fire. This list of potential dangers is not exhaustive. In any of these scenarios it is likely that a sensor in the vehicle, for example a collision sensor controlling the deployment of the vehicle's airbags has been activated.

Accordingly, a need exists to provide a vehicle with the means capable of unlocking the doors, particularly child safety locked doors, in emergency situations.

SUMMARY OF THE INVENTION

Therefore, an object of the present invention is to provide an automotive child safety door lock system that, keeping all the advantages of prior art, would be free of its above-described drawbacks.

Another object of the invention is to provide an automotive child safety door lock system that would not prevent children from exiting a vehicle in danger.

Yet another object of the present invention is to provide an automotive child safety door lock system that is operable by the action of various vehicle emergency condition sensors.

The above objects are attained in the present invention in which an automotive child safety door lock system is provided comprising a door lock mechanism, a vehicle emergency condition sensor, and means for activating release of the door lock mechanism by the action of the emergency condition sensor.

The emergency condition sensor may include a collision sensor triggering the airbag. Specifically, the electrical signal from the airbag trigger circuitry can feed a door lock solenoid, and the solenoid would release the child safety latch.

The emergency condition sensor may include a smoke detector, a temperature (fire) sensor, or any combination of vehicle emergency condition sensors.

The action of the emergency condition sensor may also be used to trigger a quick cutoff of the vehicle battery and fuel lines.

BRIEF DESCRIPTION OF THE DRAWINGS

These and other objects, features and advantages of the present invention will be best understood from the ensuing description if considered in conjunction with the accompanying drawings in which.

DESCRIPTION OF THE PREFERRED EMBODIMENT

Figure 1:
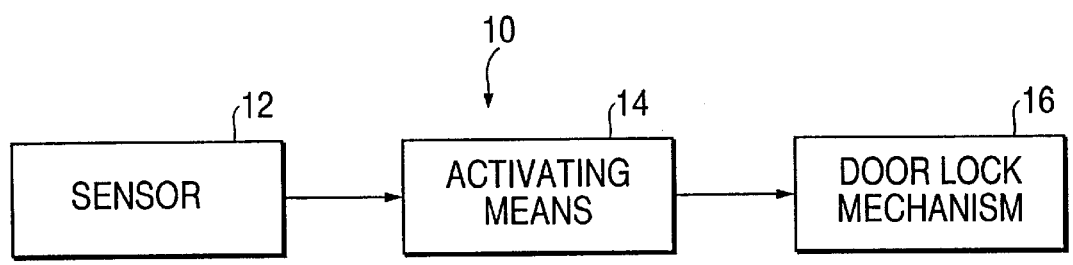
FIG. 1 presents a structural diagram illustrating a general concept of the present invention.
Figure 3:
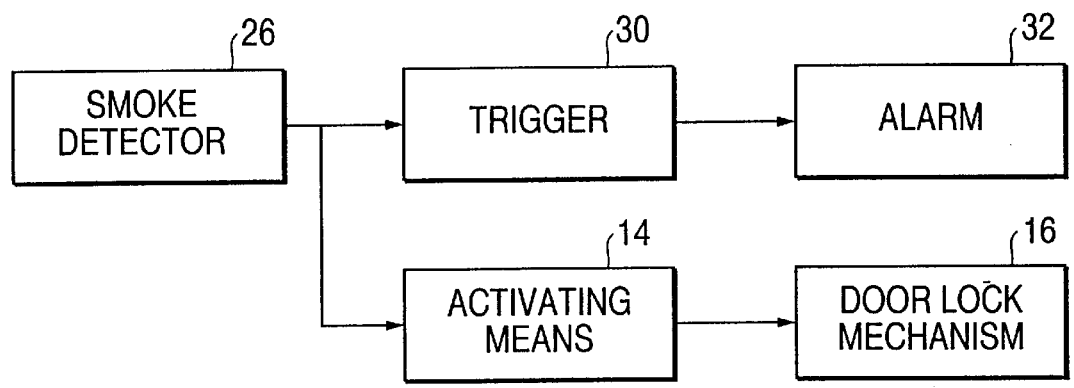
FIGS. 3 and 4 illustrate the use of other types of automobile alarm sensors for the purposes of the present invention.
Figure 4:
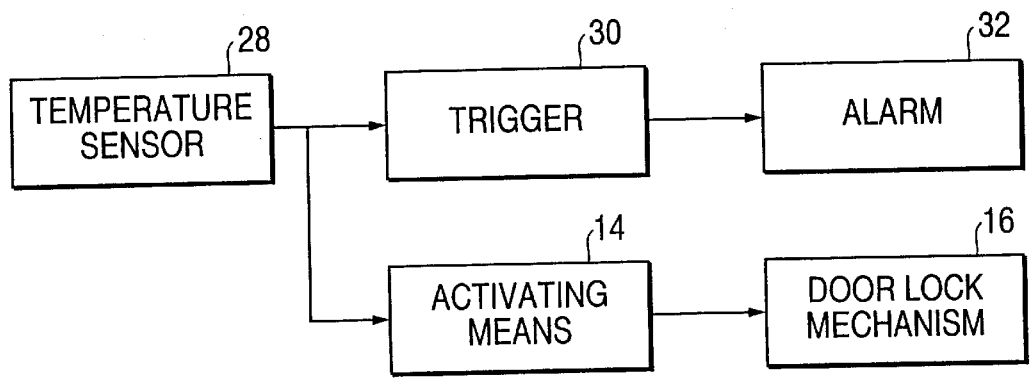
Figure 2:
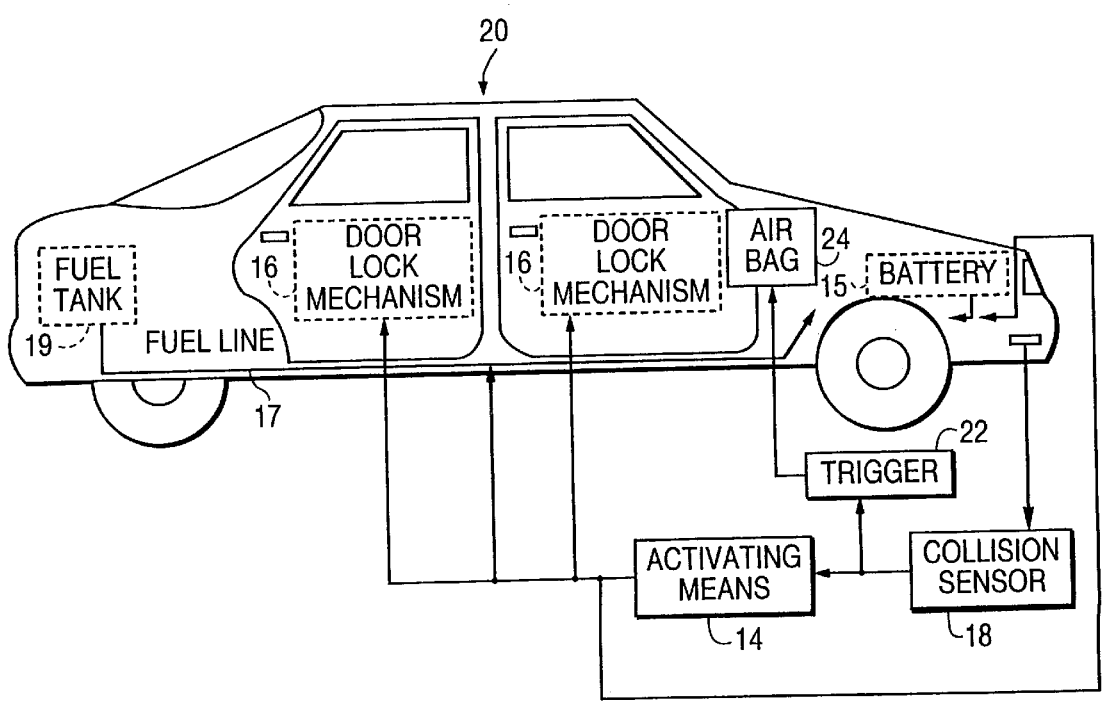
FIG. 2 shows an example of using an airbag collision sensor for the purposes of the present invention.

FIG. 1 illustrates a structural diagram of a system 10 according to the general concept of the present invention. FIGS. 2 to 4 illustrate specific implementations of the system 10 of the present invention. The system 10 generally comprises a sensor 12 and activating means 14 for activating at least one door lock mechanism 16. The sensor 12 may include a collision (impact) sensor 18 in a vehicle 20 (FIG. 2) conventionally controlling a trigger circuit 22 for activating an airbag mechanism 24. Alternatively, as shown in FIGS. 3 and 4, the sensor 12 may include a smoke detector 26 or a temperature detector 28 conventionally controlling a trigger circuit 30 activating an alarm 32. The door lock mechanism 16 may comprise a solenoid (not shown) that would be actuated by a signal originated by the sensor 26 or 28.

The activating means 14 can also provide a signal to a battery 15 to cut off the same from electrical circuitry of the vehicle and to a fuel line 17 from a fuel tank 19 to disconnect the fuel line (17) from the engine (not shown) to prevent a fire.

In operation, as soon as a critical event such as a collision and/or fire occurs to the vehicle 20, the sensor (sensors) 12 detects the event. If the event is a collision, the collision sensor 18 becomes is actuated. In parallel with its regular function to trigger the airbag mechanism 24 through the trigger circuit 22, the collision sensor 18 also signals the activating means 14 (that may include, for example, another trigger circuit and a solenoid driver circuit not shown in the drawings). The activating means 14 produces an output signal that is powerful enough to cause the door lock mechanism (or mechanisms) 16 to unlock the doors. The mechanism 16 can be of any conventional type, including the type disclosed in the above-cited U.S. Pat. No. 4,652,768.

If the emergency event is fire, the temperature sensor 28 (or the smoke detector 26), in parallel with its regular function to activate the alarm 32 by means of the trigger circuit 30, triggers the activation means 14 to release the door lock mechanism 16.

In the above-described manner, the vehicle door lock mechanism can be deactivated under emergency circumstances to allow free egress from the vehicle, and thus accomplish the above-listed objectives.

Also, the activating means 14 may disconnect the battery from the rest of the vehicle electrical circuitry. This is to be done with a minimal delay to allow release of the door lock mechanism. The actuating means 14 may also interrupt the fuel supply to the engine.

While several embodiments of the present invention have been disclosed hereinabove, it is to be understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. A system for automatically unlocking doors of an automobile in case of emergency, the system comprising:

an emergency condition sensor comprising a smoke detector; and a door lock release mechanism that receives a signal that is output by said smoke detector;

wherein said door lock release mechanism releases a door lock mechanism including a child safety lock of said door lock mechanism upon receipt of a signal from said smoke detector indicating a presence of smoke.

2. The system of claim 1, wherein said emergency condition sensor further includes a collision sensor, wherein said door lock release mechanism also receives a signal that is output by said collision sensor and releases said door lock mechanism including said child safety lock of said door lock mechanism upon receipt of a signal from said collision detector indicating a collision.

3. The system of claim 2, wherein said signal that is output by said collision sensor is also provided to a vehicle airbag deployment mechanism.

4. The system of claim 1, wherein said door lock release mechanism also interrupts a flow of electricity from a battery to electrical circuits of said automobile upon receipt of a signal from said smoke detector indicating a presence of smoke.

5. The system of claim 1, wherein said door lock release mechanism also interrupts a flow of fuel from a fuel tank of said automobile upon receipt of a signal from said smoke detector indicating a presence of smoke.

6. A system for automatically unlocking an automotive door lock in case of emergency, the system comprising:

an emergency condition sensor comprising a temperature sensor; and a door lock release mechanism that receives a signal that is output by said temperature sensor;

wherein said door lock release mechanism releases a door lock mechanism including a child safety lock of said door lock mechanism upon receipt of a signal from said temperature sensor indicating a temperature greater than a predetermined limit.

7. The system of claim 6, wherein said emergency condition sensor further includes a collision sensor, wherein said door lock release mechanism also receives a signal that is output by said collision sensor and releases said door lock mechanism including said child safety lock of said door lock mechanism upon receipt of a signal from said collision detector indicating a collision.

8. The system of claim 7, wherein said signal that is output by said collision sensor is also provided to vehicle airbag deployment mechanism.

9. A method of automatically unlocking doors of an automobile in case of fire, the method comprising releasing a door lock mechanism, including a child safety lock of said door lock mechanism, upon receipt by a door lock release mechanism of a signal from a fire detector indicating detection of a condition indicative of fire.

10. The method of claim 9, further comprising:

detecting a presence of smoke with a smoke detector; and signaling said door lock release mechanism to release said door lock mechanism with a signal from said smoke detector output in response to said detection of smoke.

11. The method of claim 9, further comprising:

detecting a temperature indicative of fire with a temperature sensor; and signaling said door lock release mechanism to release said door lock mechanism with a signal from said temperature sensor output in response to said detection of a temperature indicative of fire.

12. The method of claim 9, further comprising:

detecting a collision with a collision sensor; and signaling said door lock release mechanism to release said door lock mechanism with a signal from said collision sensor output in response to said detection of a collision.

13. The method of claim 12, further comprising operating a vehicle airbag deployment mechanism in response to said signal that is output by said collision sensor.

14. The method of claim 9, further comprising interrupting a flow of electricity from a battery to electrical circuits of said automobile upon receipt of a signal from said fire detector indicating a presence of fire.

15. The method of claim 9, further comprising interrupting a flow of fuel from a fuel tank of said automobile upon receipt of a signal from said fire detector indicating a presence of fire.

* * * * *